United States Patent
Lawson et al.

(10) Patent No.: US 6,345,943 B1
(45) Date of Patent: Feb. 12, 2002

(54) TRANSFORMER TRAILER

(76) Inventors: John D. Lawson, 1260 Barron Rd.; Matthew E. Smith, Rte. 11, Box 436, both of Poplar Bluff, MO (US) 63901

( * ) Notice: Subject to any disclaimer, the term of this patent is extended or adjusted under 35 U.S.C. 154(b) by 0 days.

(21) Appl. No.: 09/542,368

(22) Filed: Apr. 4, 2000

(51) Int. Cl.[7] .................................................. B60P 3/08
(52) U.S. Cl. .......................... 410/29.1; 410/14; 410/24; 410/26
(58) Field of Search ................................ 410/4, 14, 24, 410/26, 29.1; 187/215, 252, 253; 105/370

(56) References Cited

U.S. PATENT DOCUMENTS

| | | | |
|---|---|---|---|
| 3,033,606 A | 5/1962 | Turner | |
| 3,424,489 A | 1/1969 | Hoy | |
| 3,449,010 A | 6/1969 | Hoy | |
| 3,720,437 A | 3/1973 | Lambert | |
| 3,913,496 A | 10/1975 | Lohr | |
| 3,993,342 A | 11/1976 | Jones et al. | |
| 4,061,390 A | 12/1977 | Schall | |
| 4,701,086 A | * 10/1987 | Thorndyke | 410/26 |
| 4,801,229 A | * 1/1989 | Hanada et al. | 410/26 |
| 4,966,510 A | * 10/1990 | Johnson, Jr. | 410/26 |
| 4,992,013 A | 2/1991 | Westerdale | 410/29.1 |
| 5,332,345 A | 7/1994 | Lillard | 410/29.1 |
| 5,676,507 A | * 10/1997 | Lugo | 410/29.1 |
| 6,027,290 A | * 2/2000 | Andre | 410/24 |

FOREIGN PATENT DOCUMENTS

| | | |
|---|---|---|
| FR | 2 331 463 | 6/1977 |
| GB | 653712 | 5/1951 |

* cited by examiner

Primary Examiner—Stephen T. Gordon
(74) Attorney, Agent, or Firm—Husch & Eppenberger, LLC; Dutro E. Campbell, II

(57) ABSTRACT

A heavy load transport vehicle which has the ability of transforming from a flat-bed trailer into a multiple-automobile transporter, having a hydraulic-powered retractable upper deck; hydraulic-powered lift arms that are designed to allow the vehicle to transport wide loads and to be loaded from the side of the lower deck; a stabilizer system which minimizes or eliminates lateral movement of the vehicle during operation on the road; a truss assembly that is designed to synchronize the action of the hydraulic-powered lift arms; and a cable pulley system which assists in the raising of the front end of the upper deck.

15 Claims, 6 Drawing Sheets

TRANSFORMER TRAILER

TECHNICAL FIELD

The present invention relates generally to heavy load transport vehicles and more particularly to a heavy load transport vehicle having a hydraulic-powered retractable upper deck.

BACKGROUND OF THE INVENTION

Transport vehicles known in the art for transporting automobiles and other heavy loads generally comprise a lower deck and an upper deck which is held above the lower deck by means of fixed posts. In the past, such vehicles required use of a suitable ramp in order to mount loads onto the upper deck. Loading the upper deck became easier with the development of transport vehicles having an upper deck capable of being raised and lowered by hand operated or power operated devices. In many of these types of vehicles, the upper deck is vertically movable along support posts extending from opposite sides of the lower deck. These support posts limit the width of the load which may be carried when the upper deck is in the lowered position. Also, for those transport vehicles, where the load to be carried on the upper deck is mounted on the upper deck while the deck is in the lowered position, the support posts may restrict the width of the load capable of being carried on the upper deck. Furthermore, the support posts may make it difficult, if not impossible, to load the decks from either side of the vehicle.

The ability to carry wider loads is significant. Transport vehicles that provide only for the hauling of automobiles, for example, may at times be economically prohibitive. In the case of a transporter who delivers a load of cars to a designated location, the inability to load anything other than cars onto the transport vehicle may require the transporter to make the return trip with no load to be hauled.

The transport vehicles known in the art which have a vertically movable upper deck may be unsafe when heavy loads are mounted upon the raised upper deck. This is because at the high speeds typically reached while driving on the highway, the upper deck may be subject to lateral movement and shaking. This could compromise the vehicle driver's ability to safely maneuver the vehicle. Furthermore, this instability could potentially lead to damage to the load being hauled or damage to the vehicle over time.

Also, a number of transport vehicles known in the art have two vertically spaced decks with a hydraulically-powered means for raising and lowering the upper deck. These vehicles often encounter problems in the operation of the plurality of hydraulic lifts which raise and lower the upper deck. In particular, these vehicles commonly have problems raising and lowering the upper deck uniformly, with all of the hydraulic lifts raising and lowering in a synchronized manner. This problem could lead to maintenance problems as well as pose a safety hazard as a heavy load carried on the upper deck could potentially fall off the vehicle if the upper deck is raised or lowered unevenly. More importantly, such a system that lacks the means to synchronize the raising and lowering of the hydraulic cylinders would require a powerful and costly driving means for actuating the hydraulic cylinders.

Trailers generally known in the art are also limited by height restrictions imposed by federal and state Department of Transportation regulations relating to vehicle height. In the fully retracted position, with the upper deck in the lowered position, the transport vehicle may carry a load upon the upper deck. However, the total height of the load must be sufficiently low to allow travel under bridges and overpasses and to otherwise comply with federal and state regulations. The design limitations of the trailers generally known in the art do not allow the upper deck to be positioned low enough to comply with statutory height restrictions while carrying such loads.

SUMMARY OF THE INVENTION

The main object of the present invention is to overcome the above disadvantages of the transport vehicles known in the art. According to the present invention there is provided a load transporting vehicle comprising a lower deck having a set of wheels near the rear portion of said vehicle and a means for supporting the front portion of the lower deck located at the front end of the lower deck; an upper deck; and a means by which the upper deck is supported above the lower deck and by which the upper deck is adjusted between a raised, unretracted position and a lowered, fully retracted position, comprising a plurality of single-action hydraulic cylinders which are each pivotably connected at one end to the lower deck via a hydraulic cylinder lower mounting pin and pivotably connected at the other end to a lift arm via an upper hydraulic cylinder bracket, a plurality of lift-arms which are each pivotably connected at one end to the lower deck and pivotably connected at their other end to the hydraulic cylinder, a stabilizer track system that is mounted to the lower deck and guides the upper deck in a vertical up and down motion and prevents the upper deck from moving in a direction transversely of the vehicle longitudinal axis.

The present invention achieves the objective of allowing wide loads to be carried upon the upper deck when the upper deck is in the fully retracted, lowered position, by virtue of its elimination of the need for support posts to raise and lower the upper deck. The present invention's upper deck stabilizer system and the design of its lifting mechanism eliminate the need for support posts, thereby allowing wider loads to be hauled upon the upper deck while it is in the lowered position.

The present invention also achieves the objective of raising and lowering the upper deck with the lift arms being actuated in a synchronized manner. This is accomplished by virtue of a truss assembly, comprising a plurality of braces that run perpendicular to the direction of travel of the vehicle and connect each pair of lift arms at the point where the lift arms are connected to the upper deck, and a series of trusses that extend across the vehicle diagonally and connect the cross braces.

The objective of transporting loads, such as conversion vehicles, on the fully retracted upper deck is achieved by virtue of the present invention's design which provides for the height of the fully retracted upper deck to be 42" above the surface upon which the vehicle travels.

BRIEF DESCRIPTION OF THE DRAWINGS

Reference is now made to the drawings which illustrate the best known mode of carrying out the invention and wherein the same reference numerals indicate the same or similar parts throughout the several views.

DESCRIPTION OF THE PREFERRED EMBODIMENTS

Figure 1:
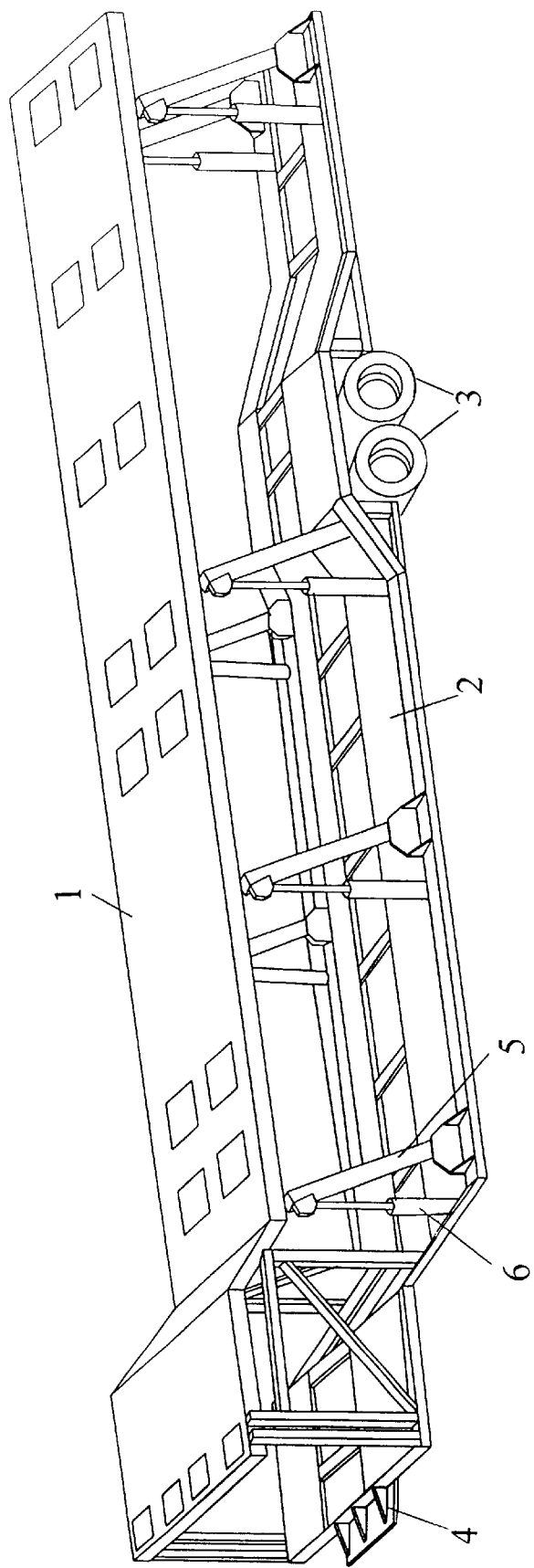
FIG. 1 is a perspective side view of the present invention with the upper deck in the raised position.

FIG. 1 shows a perspective side view of the present invention which is a load transporting vehicle. More specifically, the present invention is a trailer having two platforms, an upper deck 1 and a lower deck 2, upon which heavy loads may be placed for hauling. The rear portion of the lower deck 2 is supported by a set of at least four road wheels 3 (only 2 are shown) located toward the rear of the transport vehicle, relative to the direction of travel. Located at the front end of the lower deck 2 is a means 4 by which the lower deck 2 is detachably connected to a conventional means for towing the load transporting vehicle, such as a truck. Alternatively, the front end of the load transporting vehicle may have a conventional driving means which is capable of driving or propelling the vehicle in the desired direction.

Figure 2:
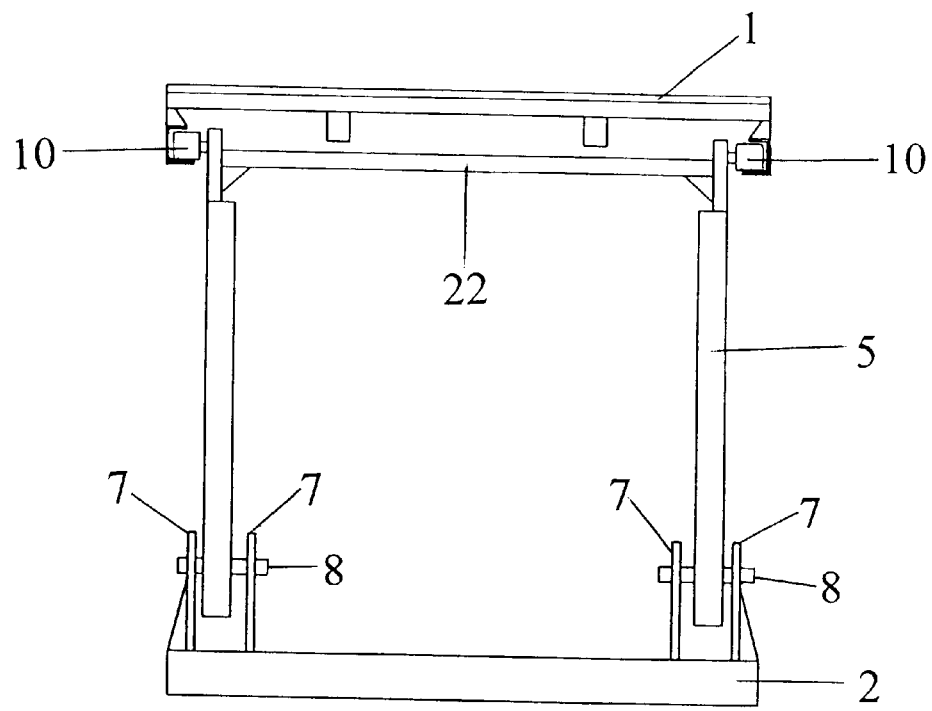
FIG. 2 is a rear view of the present invention's lift arm unit.

As shown in FIG. 1, the upper deck 1 is positioned above the lower deck 2 and is supported by a plurality of lift arms 5, which are preferably constructed of steel. Each lift arm 5 is pivotally connected at one end to the lower deck 2 and pivotally connected at its other end to a hydraulic cylinder 6. FIG. 2 shows how each pivot point, where the lift arms 5 are connected to the lower deck 2, may advantageously be comprised of two identical pieces of flat steel 7 which have a hole bored through each and are attached to the lower deck 2, and a steel pin 8 which is positioned such that it travels through the holes in the identical pieces of flat steel 7 and through the lift arm 5, thus pivotally securing the lift arm 5 at its lower pivot point.

Figure 3:
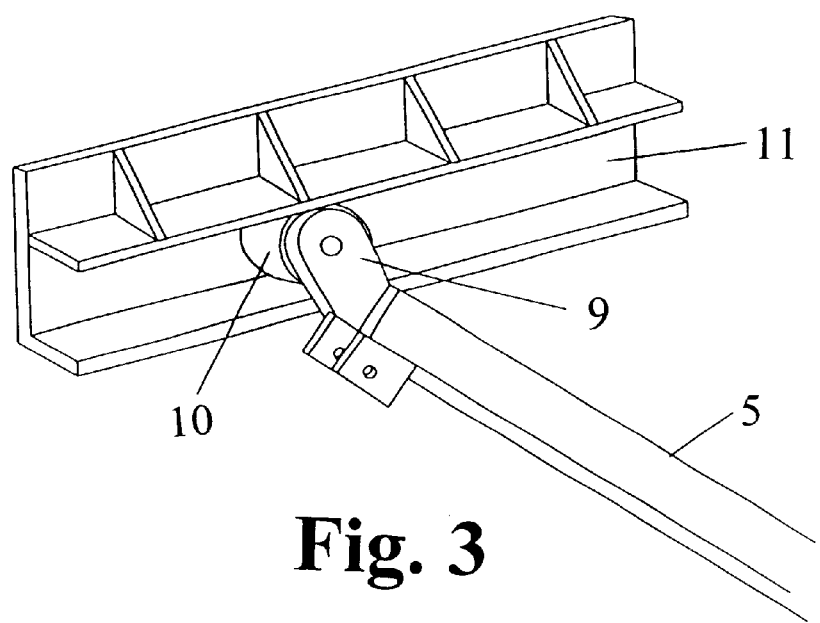
FIG. 3 is a perspective side view of the present invention's upper deck track roller system.

As shown in FIG. 3, each lift arm 5 is slidably connected to the upper deck 1 by an upper deck 1 track roller system. At the end of each the lift arm 5, opposite the end where the lift arm 5 is pivotally connected to the lower deck 2, there is provided a flat piece of steel 9 welded to the lift arm 5 upon which a steel roller 10 is welded. The steel rollers 10 roll along the length of a track 11 which spans the length of each side of the upper deck 1. As the lift arms 5 are actuated to lift the upper deck 1, the end of each lift arm 5 that is slidably connected to the upper deck 1, rolls along the length of the track 11 until preferably the lift arm 5 is roughly perpendicular to the plane of the lower deck 2. Conversely, the end of each lift arm 5 rolls along the track 11 in the opposite direction as the upper deck 1 is lowered.

Figure 4:
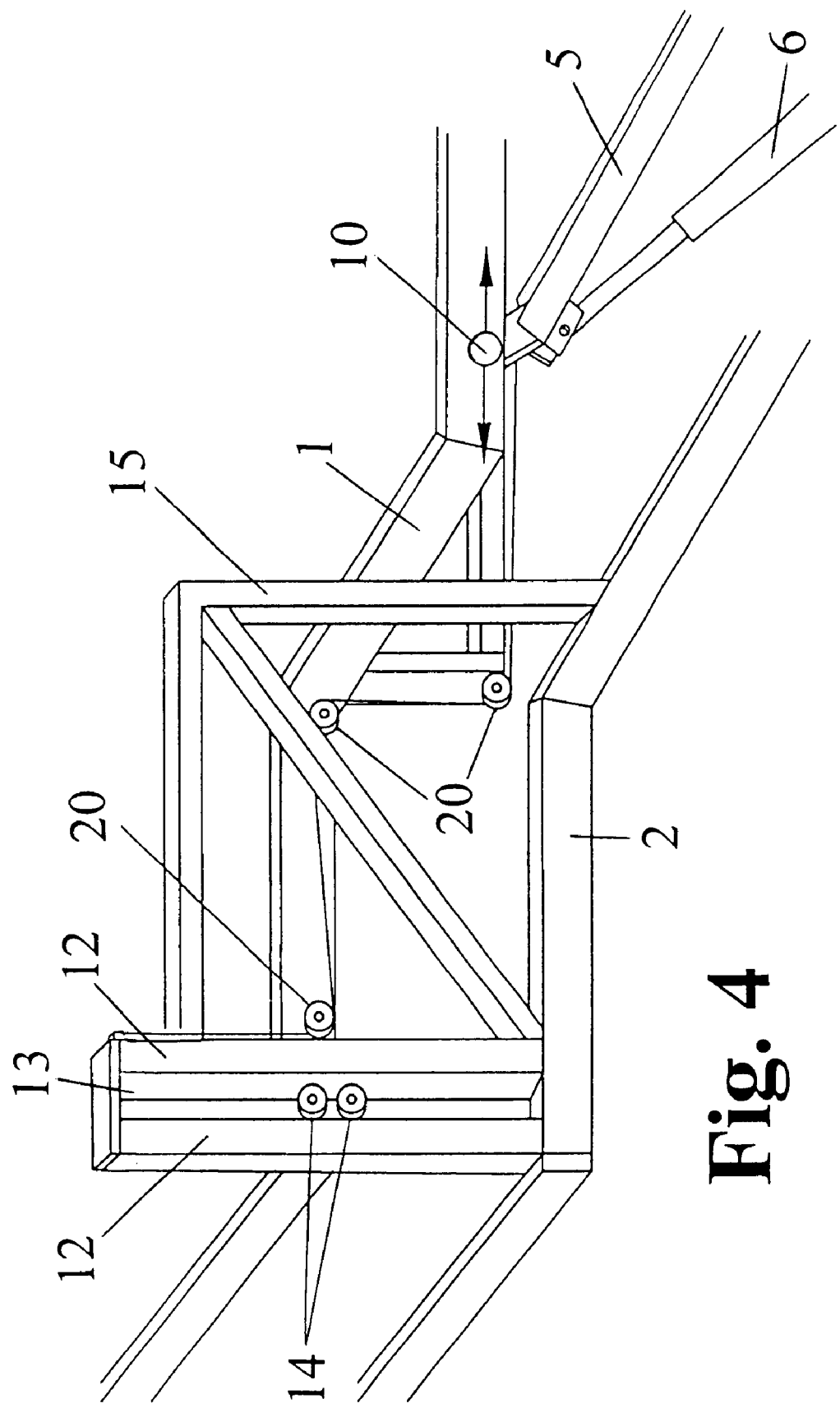
FIG. 4 is a perspective side view of the present invention's upper deck stabilizer system.

FIGS. 1 and 4 show a stabilizer track system which is preferably comprised of two vertical guide posts 12 which are mounted perpendicularly to the lower deck 2. Each guide post 12 has a vertical track 13 that runs along the entire length of the guide post 12; sealed bearing steel rollers 14 which are mounted to the upper deck 1 and roll along the vertical track 13 of the guide posts 12; and a stabilizer trussing 15 secured to the lower deck 2 and the guide posts 12. This system is designed to guide the upper deck 1 in a vertical up and down motion above the lower deck 2. This system also secures the upper deck 1 and prevents the upper deck 1 from moving in a direction transversely of the vehicle longitudinal axis. An additional stabilizer system may be advantageously added to the rear portion of the load transporting vehicle to further stabilize the upper deck 1.

Figure 5:
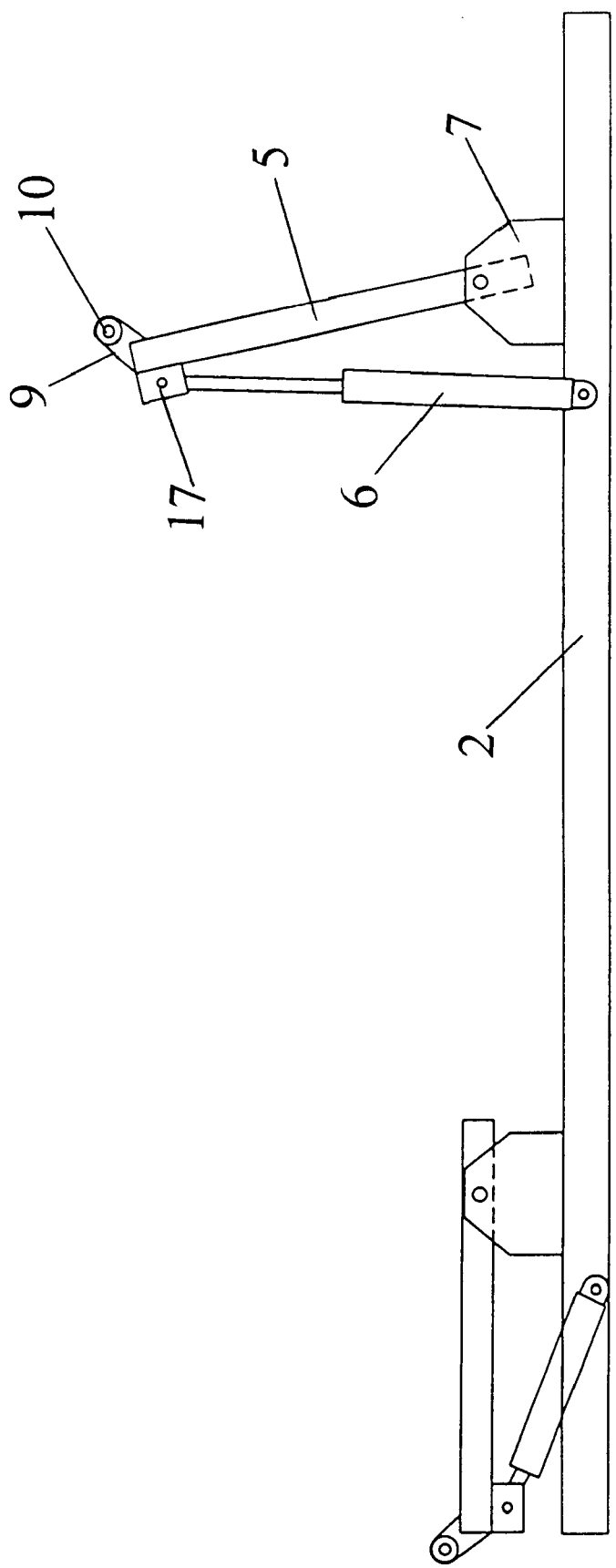
FIG. 5 is a side view of the present invention's lifting mechanisms, one in the "down" position when the upper deck is lowered, and one in the "up" position when the upper deck is raised.

As shown in FIGS. 1 and 5, a plurality of hydraulic cylinders 6 are each pivotally connected to the lower deck 2 by a lower cylinder 6 pivot bolt 16 and pivotally connected to a lift arm 5 by an upper cylinder pin 17. These hydraulic cylinders 6 are double-action cylinders driven by a self-contained hydraulic pump located in close proximity to the trailer axes that connect the wheels 3 of the lower deck 2. The self-contained hydraulic pump operates using battery power from at least one battery that is advantageously charged by the towing device or driving means for propelling the load transporting vehicle. The hydraulic cylinders 6 are actuated to cause the lift arms 5 to lower or raise the upper deck 1.

Figure 6:
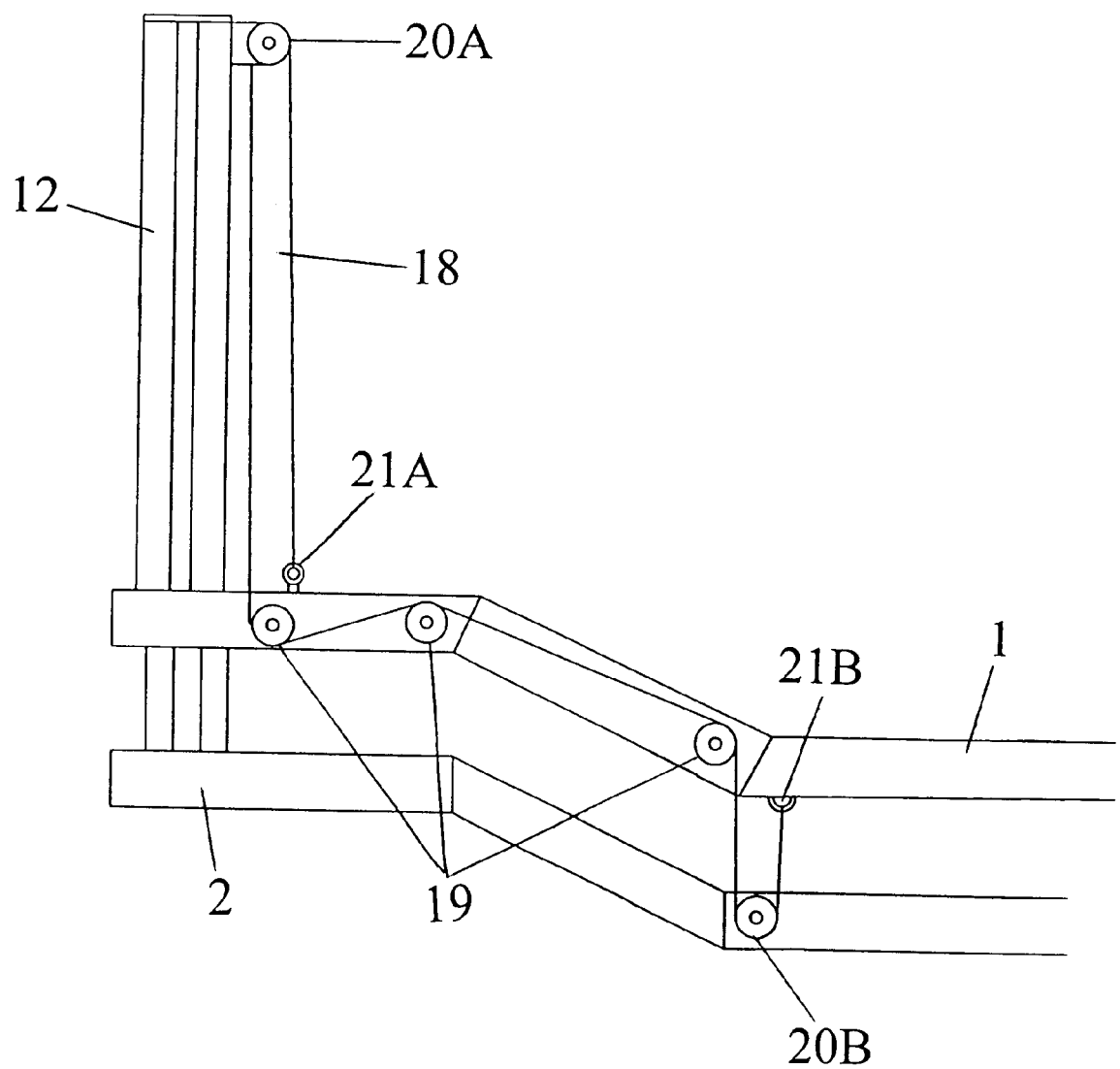
FIG. 6 is a side view of the present invention's cable pulley system.

The raising and lowering of the front end of the upper deck 1 is aided by a cable pulley system, shown in FIG. 6. The cable pulley system includes a plurality of pulleys 19 that are mounted upon the outer edges of the upper deck 1 at each side of the vehicle, two lifting pulleys 20A (only one shown) that are each bolted to one of the guideposts 12 of the stabilizer track system, and two pulleys 20B (only one shown) mounted upon the outer edges of the lower deck 2 at each side of the vehicle. The pulleys 19, 20A, 20B each have a grooved rim along which two cables 18 run across. The cables 18 weave through the series of pulleys 19, 20A, 20B. The lifting pulleys 20A reverse the pulling power of the cables 18 to lift the front end of the upper deck 1 at the rate the lift arms 5 raise the upper deck 1. One end of each cable 18 is advantageously bolted to the loading surface or the outer edges of the upper deck 1 near the front of the trailer preferably by a turn buckle type bolt 21A which provides for adjustment as the cables 18 stretch over time. The other end of each cable 18 is advantageously bolted to the underneath or to either of the outer edges of the upper deck preferably by another turn buckle type bolt 21B. The exact same configuration of pulleys and a cable is found, although not shown, on the opposite side of the vehicle shown in FIG. 6.

Figure 7:
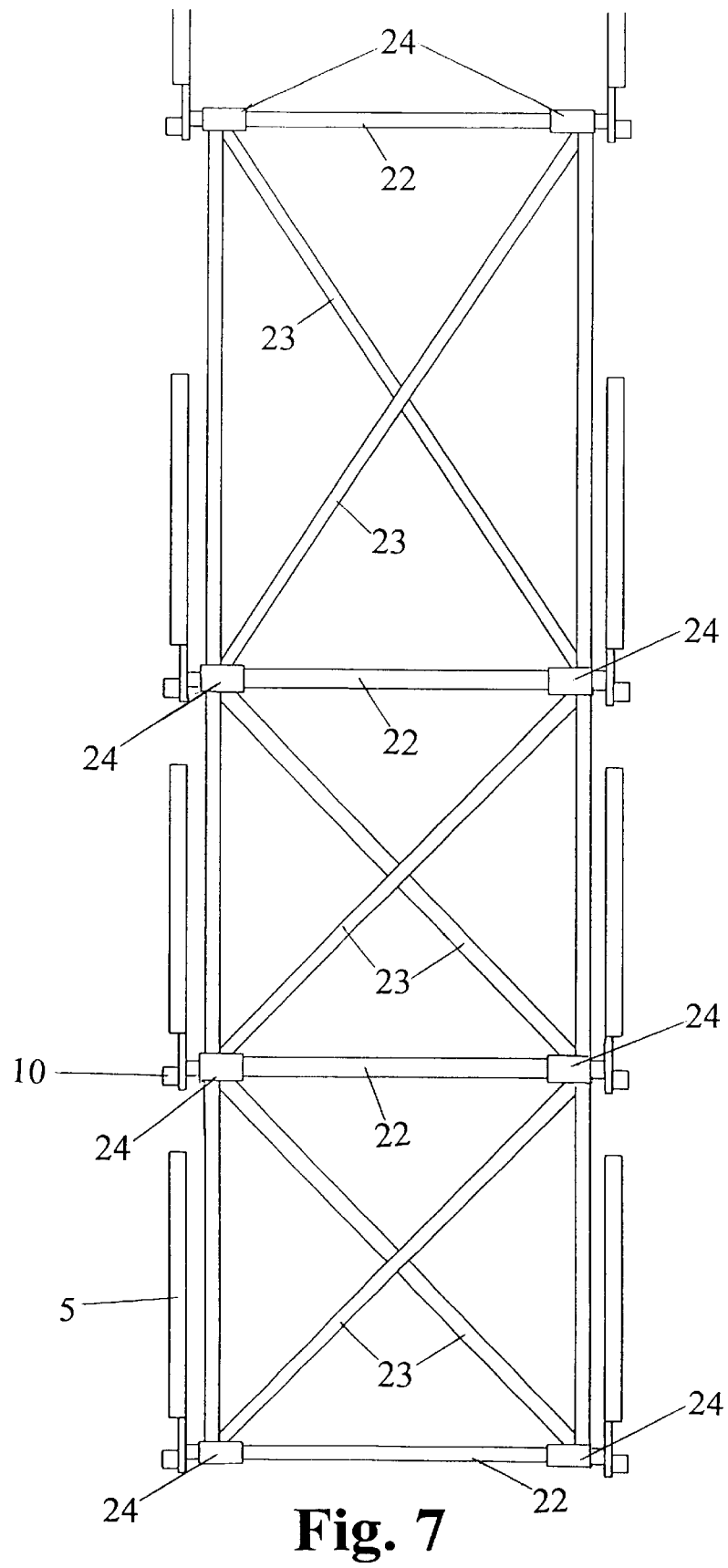
FIG. 7 is a top view of the present invention's lift arm synchronizing truss assembly.

The plurality of lift arms 5 and hydraulic cylinders 6 are actuated in a synchronized manner, which is made possible by the truss assembly shown in FIG. 7. As can be seen in FIG. 7, the truss assembly is comprised of a plurality of cross braces 22 that extend across the underside of the upper deck 1, in the direction perpendicular to the direction of travel of the vehicle, and a plurality of trusses 23 that extend across the underside of the upper deck 1 diagonally and connect the cross braces 22. The plurality of trusses 23 may advantageously be secured by being welded to bushings 24 that encompass the cross braces 22. Each of the cross braces 22 connects a lift arm 5 to a corresponding lift arm 5 positioned on the opposite side of the vehicle. The cross braces 22 also stabilize the lift arms 5, thereby preventing the steel rollers that are bolted to the lift arms 5 from coming out of the tracks that span the length of each side of the upper deck 1. As the upper deck 1 is raised and lowered, the lift arms 5 will be actuated in a synchronized manner because the truss assembly connects each lift arm 5, making it impossible for any one lift arm 5 to extend or retract without causing the others to synchronously extend or retract to the same extent. The truss assembly likewise causes the hydraulic cylinders 6 to be actuated in unison because the hydraulic cylinders 6 are connected to the lift arms 5 and, thus, move at the same rate as the lift arms 5. The synchronization of the cylinders 6 efficiently distributes the power necessary to lift the upper deck 1, which in turn, makes it possible for the upper deck 1 to be raised even when its height is less than 42" above the ground in the fully retracted, lowered position.

Other objects, features and advantages will be apparent to those skilled in the art. While preferred embodiments of the present invention have been illustrated and described, this has been by way of illustration and the invention should not be limited except as required by the scope of the appended claims.

We claim:

1. A load transporting vehicle comprising:
   a lower deck having opposite sides, a set of wheels located at and supporting a rear portion of said lower deck, and means located at a front end of the lower deck for supporting a front portion of the lower deck;
   an upper deck having opposite sides and disposed above the lower deck;
   moving means for moving the upper deck between a raised, unretracted position and a lowered, fully retracted position; and
   a cable pulley system cooperating with the moving means for assisting in raising the front end of said upper deck, the cable pulley system comprising:
     a plurality of pulleys mounted at opposite sides of the upper and lower decks;
     at least one pulley mounted at each of two vertical guide posts which are mounted perpendicularly at opposite sides of the lower deck; and
     a cable entrained over the pulleys at each respective side.

2. A vehicle according to claim 1, further comprising a stabilizing means for preventing the upper deck from moving in a direction transversely of a longitudinal axis of the vehicle, wherein the stabilizing means comprises:
   said two vertical guide posts which are mounted perpendicularly to the lower deck, each said guide post having a vertical track that runs along the entire length of each guide post;
   steel rollers which are mounted to the upper deck and roll along the vertical tracks of said guide posts; and
   a stabilizer trussing secured to the lower deck and said guide posts.

3. A load transporting vehicle comprising:
   a lower deck having a set of wheels supporting the rear portion of said vehicle located near the rear end of the lower deck and a means for supporting the front portion of the lower deck located at the front end of the lower deck;
   an upper deck; and
   a means by which the upper deck is supported above the lower deck and the upper deck is adjusted between a raised, unretracted position and a lowered, fully retracted position, comprising:
     a plurality of hydraulic cylinders which are each pivotably connected to the lower deck by a bolt;
     a plurality of lift-arms which are each pivotably connected at one end to the lower deck and pivotably connected at their other end to one of the hydraulic cylinders and the upper deck; and
     a means for preventing the upper deck from moving in a direction transversely of the vehicle longitudinal access, which is a stabilizer track system comprising:
       two vertical guide posts which are mounted perpendicularly to the lower deck and which each have a vertical track that runs along the entire length of each guide post;
       steel rollers which are mounted to the upper deck and roll along the vertical tracks of said guide posts; and
       a stabilizer trussing secured to the lower deck and said guide posts.

4. A vehicle according to claim 3, wherein said hydraulic cylinders are driven by a self-contained hydraulic pump.

5. A vehicle according to claim 4, wherein said self-contained hydraulic pump operates using battery power from at least one battery that is charged by another vehicle which serves as a towing device for pulling the load transporting vehicle.

6. A vehicle according to claim 4, wherein said self-contained hydraulic pump operates using battery power from at least one battery that is charged by a driving means by which the transport vehicle is self-propelled.

7. A vehicle according to claim 3, wherein said means for supporting the front portion of the lower deck comprises a coupling for linking the load transporting vehicle to a towing device.

8. A vehicle according to claim 3, having a cable pulley system for assisting in raising the front end of said upper deck as said lift arms raise said upper deck, comprising a pair of cables and a plurality of pulleys mounted to said vehicle.

9. A vehicle according to claim 8, wherein said cables are each attached at one end to a loading surface of the upper deck and are attached at their other end to the underside of the upper deck.

10. A vehicle according to claim 8, wherein at least one end of each said cable is attached to the outer edges of the upper deck.

11. A vehicle according to claim 8, wherein said plurality of pulleys comprises at least two pulleys that are mounted upon the outer edges of the upper deck at each side of the vehicle, at least one pulley mounted upon each outer edge of the lower deck and at least one pair of lifting pulleys that are each mounted upon a respective one of said guide posts of said stabilizer track system and which provides a reversal of pulling power of the cable and assist the lifting of the upper deck as the lift arms are powered to lift the upper deck.

12. A vehicle according to claim 8, wherein said cables are each bolted to the upper deck by turn buckles which provide for adjustment as said cables stretch over time and after extensive use.

13. A vehicle according to claim 3, having a means for synchronizing the movement of said lift arms and hydraulic cylinders as the lift arms raise and lower the upper deck.

14. A vehicle according to claim 13, wherein said means for synchronizing the movement of said lift arms and hydraulic cylinders is a synchronizing truss assembly comprising a plurality of cross braces that connect each lift arm to its corresponding lift arm positioned on the opposite side of the vehicle and span across the underside of the vehicle in the direction perpendicular to the direction of travel, and a plurality of trusses that extend across the vehicle diagonally and connect the cross braces.

15. A vehicle according to claim 3, wherein the total height of said upper deck in its fully retracted position is no greater than 42 inches from the surface upon which the vehicle travels.

* * * * *